(12) United States Patent
Zhao et al.

(10) Patent No.: US 10,186,992 B2
(45) Date of Patent: Jan. 22, 2019

(54) CENTRALIZED CONTROL MECHANISM FOR MULTI-MOTOR DRIVE

(71) Applicant: ZHONGSHAN BROAD-OCEAN MOTOR CO., LTD., Zhongshan (CN)

(72) Inventors: Yong Zhao, Zhongshan (CN); Yunsheng Chen, Zhongshan (CN); Xiansheng Zhang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 15/791,374

(22) Filed: Oct. 23, 2017

(65) Prior Publication Data

US 2018/0048250 A1 Feb. 15, 2018

Related U.S. Application Data

(63) Continuation-in-part of application No. PCT/CN2015/090342, filed on Sep. 23, 2015.

(30) Foreign Application Priority Data

Apr. 27, 2015 (CN) .................... 2015 2 0260561 U
May 13, 2015 (CN) .................... 2015 2 0309450 U

(51) Int. Cl.
*H02P 1/54* (2006.01)
*H02P 5/74* (2006.01)
*H02P 6/04* (2016.01)
*G05B 19/418* (2006.01)

(52) U.S. Cl.
CPC .............. *H02P 5/74* (2013.01); *G05B 19/418* (2013.01); *H02P 6/04* (2013.01)

(58) Field of Classification Search
CPC ................................ G05B 19/418; H02P 5/74
See application file for complete search history.

(56) References Cited

U.S. PATENT DOCUMENTS 8,332,072 B1 * 12/2012 Schaible ................ A61B 34/30
700/257

* cited by examiner

*Primary Examiner* — Karen Masih
(74) *Attorney, Agent, or Firm* — Matthias Scholl P.C.; Matthias Scholl

(57) ABSTRACT

A centralized control mechanism for a multi-motor drive, the mechanism including: a plurality of independent motor drive modules; a power source module; an interface control microprocessor; a communication module; and a plurality of interface modules of motors. The power source module supplies power for each circuit, and each independent motor drive module drives one permanent magnet motor. Each motor drive module includes a motor microprocessor, an inverter circuit, and a phase current detection circuit. The phase current detection circuit transmits detected data to the motor microprocessor, and the motor microprocessor outputs multiple paths of PWM signals to the inverter circuit and controls the inverter circuit. An output end of the inverter circuit is connected to a coil winding of the PM motor. The plurality of motor microprocessors communicates with the interface control microprocessor via a data bus. The interface control microprocessor communicates with the outside via the communication module.

23 Claims, 13 Drawing Sheets

# CENTRALIZED CONTROL MECHANISM FOR MULTI-MOTOR DRIVE

CROSS-REFERENCE TO RELATED APPLICATIONS

This application is a continuation-in-part of International Patent Application No. PCT/CN2015/090342 with an international filing date of Sep. 23, 2015, designating the United States, now pending, and further claims foreign priority to Chinese Patent Application No. 201520260561.5 filed Apr. 27, 2015, and to Chinese Patent Application No. 201520309450.9 filed May 13, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The disclosure relates to a centralized control mechanism for a multi-motor drive.

Description of the Related Art

Conventional centralized control mechanisms for multi-motor drives leave much to be desired. The circuit configuration is complex, leading to high production costs. The power supply includes only one output terminal supplying a plurality of microprocessors; when the voltage is unstable, all the microprocessors are affected simultaneously.

SUMMARY OF THE INVENTION

It is one objective of the invention to provide a centralized control mechanism for multi-motor drives that features reasonable circuit configuration, relatively low manufacturing costs, and stable power output.

To achieve the above objectives, in accordance with one embodiment of the invention, there is provided a centralized control mechanism for a multi-motor drive, the mechanism comprising a plurality of independent motor drive modules, a power source module, an interface control microprocessor, a communication module, and a plurality of interface modules of motors; where the power source module supplies power for each circuit, each independent motor drive module drives one permanent magnet (PM) motor, motor drive module comprises a motor microprocessor, an inverter circuit, and a phase current detection circuit; the phase current detection circuit transmits detected data to the motor microprocessor, the motor microprocessor outputs multiple paths of PWM signals to the inverter circuit and controls the inverter circuit to work; an output end of the inverter circuit is connected to a coil winding of the PM motor;

the plurality of motor microprocessors communicates with the interface control microprocessor via a data bus DATABUS;

the interface control microprocessor communicates with outside via the communication module; and the interface control microprocessor is connected to one end of each interface module of motors, and the other end of each interface module of motors communicates with a control circuit board of an electrical apparatus, the control circuit board of the electrical apparatus controls one independent motor drive module to drive one PM motor via one motor interface module.

In a class of this embodiment, the plurality of independent motor drive modules is at least three in number.

In a class of this embodiment, the PM motor is a three-phase permanent magnet synchronous motor comprising three-phase coil windings.

In a class of this embodiment, the power source module outputs at least two-way power supply to the inverter circuit, and outputs at least four independent power supplies to the motor microprocessor and the interface control microprocessor.

In a class of this embodiment, the PM motor is a four-phase permanent magnet synchronous motor comprising three-phase coil windings, and the power source module outputs four independent power supplies, which are 3.3VA, 3.3VB, 3.3VC, and 3.3VD, to four motor microprocessors; the power source module outputs one independent power supply, which is 5V DC, to the interface control microprocessor; and the power source module outputs two-way power supply, which is 5VA and 15 VB, to the inverter circuit.

In a class of this embodiment, the power supply module comprises a surge current suppression circuit, a primary EMI circuit, a secondary EMI circuit, a voltage doubling rectifying circuit, and a DC-DC converter circuit; an input end of the surge current suppression circuit is connected to an AC input; the surge current suppression circuit, the primary EMI circuit, the secondary EMI circuit, the voltage doubling rectifying circuit, and the DC-DC converter circuit are connected sequentially in that order; an output end of the voltage doubling rectifying circuit outputs a DC bus voltage VDC; and an output end of the DC-DC converter circuit outputs multiple ways of independent power supplies for the inverter circuit, the interface control microprocessor, and the motor microprocessor.

In a class of this embodiment, the communication module is of a series compunction module, an external electrical apparatus communicates with the interface control microprocessor and each motor microprocessor via the series compunction module; and the interface module of motors is of an electrically insulated photocoupler.

In a class of this embodiment, the plurality of independent motor drive modules, the power source module, the interface control microprocessor, the communication module, and the plurality of interface modules of motors are integrated on one circuit board.

In a class of this embodiment, the plurality of interface modules of motors is a centralized interface unit, the centralized interface unit comprises a plurality of I/O ports connected to outside, the centralized interface unit is connected to the interface control microprocessor, the plurality of motor microprocessors communicates with the interface control microprocessor via the data bus; input control signals of the plurality of motor drive modules enter the centralized interface unit via the plurality of I/O ports, are processed by the centralized interface unit and the interface control microprocessor, and then transmitted to the motor microprocessor; and feedback output signals of the plurality of motor drive modules are first transmitted to the interface control microprocessor via the motor microprocessor and processed, then transmitted to the centralized interface unit, and output from the I/O ports of the centralized interface unit.

In a class of this embodiment, the input control signals in the plurality of I/O ports of the centralized interface unit are a PWM signal, a level signal, or a digital communication signal.

In a class of this embodiment, the input control signals in the plurality of I/O ports of the centralized interface unit comprises a plurality of PWM signals and a plurality of level signals.

In a class of this embodiment, the input control signals in the plurality of I/O ports of the centralized interface unit comprises a plurality of PWM signals and a plurality of digital communication signals.

In a class of this embodiment, the centralized control mechanism for multi-motor drive comprises four independent motor drive modules; 17 I/O ports of the centralized interface unit comprising 14 signal input ports, parts of the 14 signal input ports inputting PWM signals and the other parts thereof inputting the level signals or digital communication signals; at least two signal output ports which output PWM signals; and one serial communication port, one power source input port, and one public port.

Advantages of the centralized control mechanism for multi-motor drive according to embodiments of the present disclosure are as follows.

1) The plurality of motor drive modules of the present disclosure each comprises an independent motor microprocessor, all the interfaces are controlled by the interface control microprocessor, the plurality of motor microprocessors communicates with the interface control microprocessor via a data bus DATABUS, so the circuit has reasonable structure and compact layout, high integration, low manufacturing cost and high operating rate.

2) Each motor drive module is equipped with an independent motor microprocessor, and the power source module outputs four independent power sources to supply for four motor microprocessors, ensuring the stable and reliable operation of the centralized control mechanism.

3) The interface control microprocessor is connected to one end of each interface module of motors, the power source module outputs one independent power source to supply for the interface control microprocessor, ensuring the stable and reliable operation of the centralized control mechanism, and high operating rate.

4) The plurality of independent motor drive modules, the power source module, the interface control microprocessor, the communication module, and the plurality of interface modules of motors are integrated on one circuit board, which is conducive to decreasing the manufacturing costs and improving the reliability.

5) The input control signals of the plurality of motor drive modules enter the centralized interface unit via the plurality of I/O ports, are processed by the centralized interface unit and the interface control microprocessor, and then transmitted to the motor microprocessor; and the feedback output signals of the plurality of motor drive modules are first transmitted to the interface control microprocessor via the motor microprocessor and processed, then transmitted to the centralized interface unit, and output from the I/O ports of the centralized interface unit. Thus, the input signal type of each I/O port of the centralized interface unit can be defined by the interface control microprocessor according to actual conditions, which is flexible and convenient for the interface control microprocessor to perform unified management and uniform resource allocation, and avoids the waste caused by redevelopment due to mismatch of interfaces.

6) The interface control microprocessor is connected to a serial communication module; a peripheral electrical apparatus can communicate with the interface control microprocessor and each motor microprocessor using the serial communication module, which is convenient to write programs or perform large-scale data exchange.

7) The centralized control mechanism for multi-motor drive comprises four independent motor drive modules; 17 I/O ports of the centralized interface unit comprising 14 signal input ports, parts of the 14 signal input ports inputting PWM signals and the other parts thereof inputting the level signals or digital communication signals; at least two signal output ports which output PWM signals; and one serial communication port, one power source input port, and one public port. The configuration is reasonable and easy to manufacture.

DETAILED DESCRIPTION OF THE EMBODIMENTS

For further illustrating the invention, experiments detailing a centralized control mechanism for multi-motor drive are described hereinbelow combined with the drawings. It should be noted that the following examples are intended to describe and not to limit the invention.

Example 1

Figure 1:
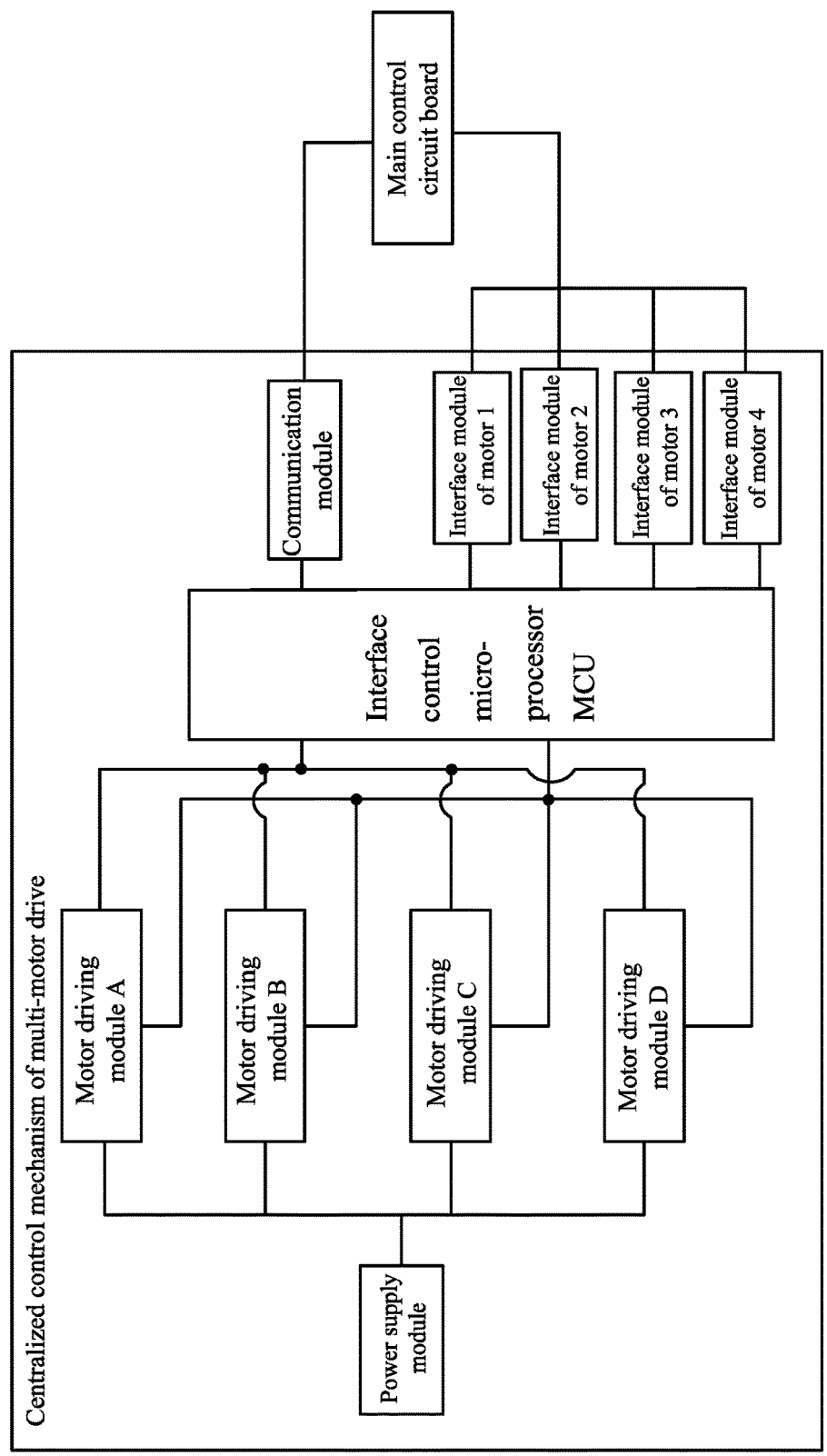
FIG. 1 is a schematic block diagram of a centralized control mechanism for multi-motor drive in Example 1 of the present disclosure.
Figure 2A:
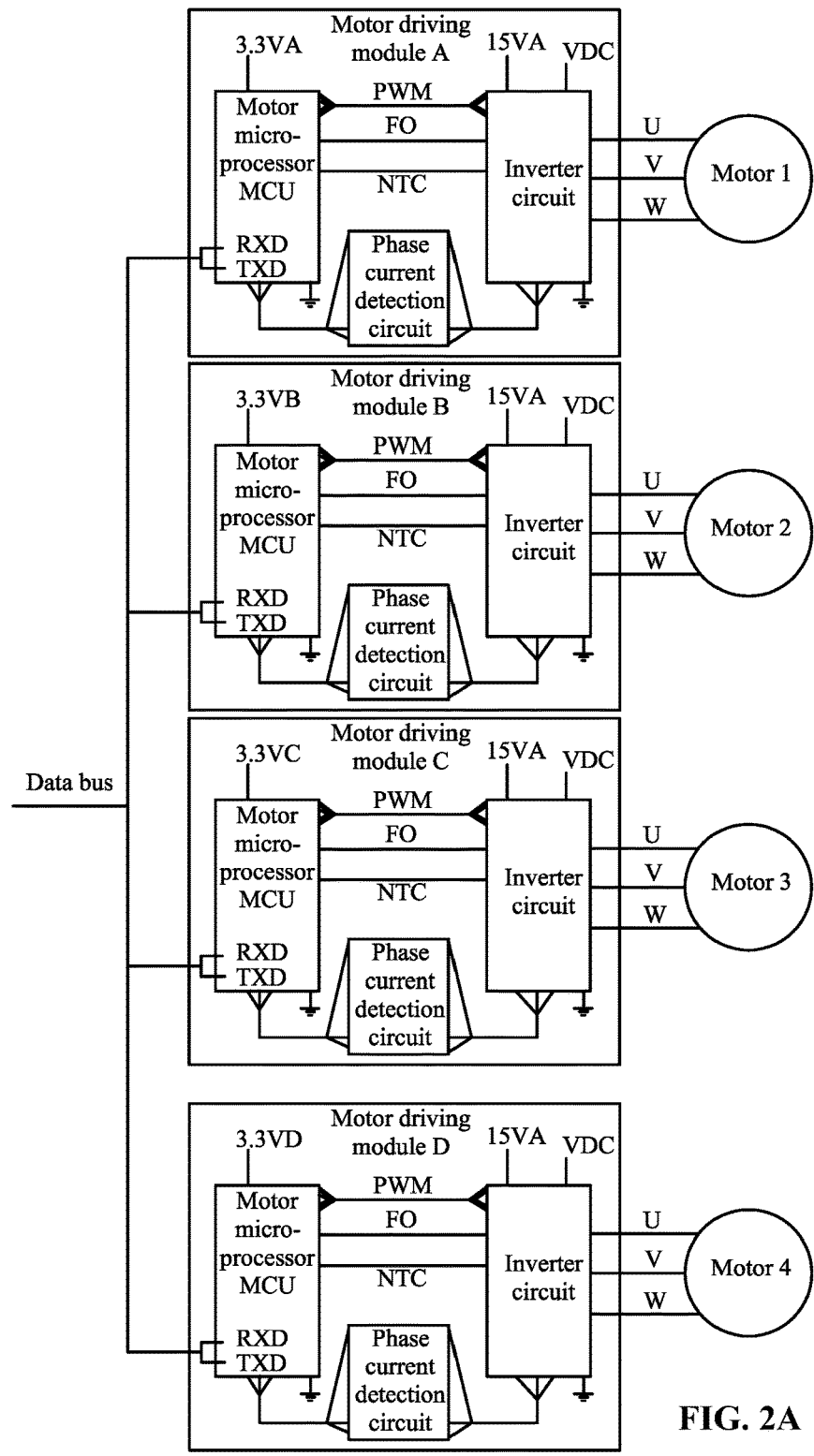
FIG. 2A and FIG. 2B are circuit diagrams corresponding to FIG. 1.
Figure 2B:
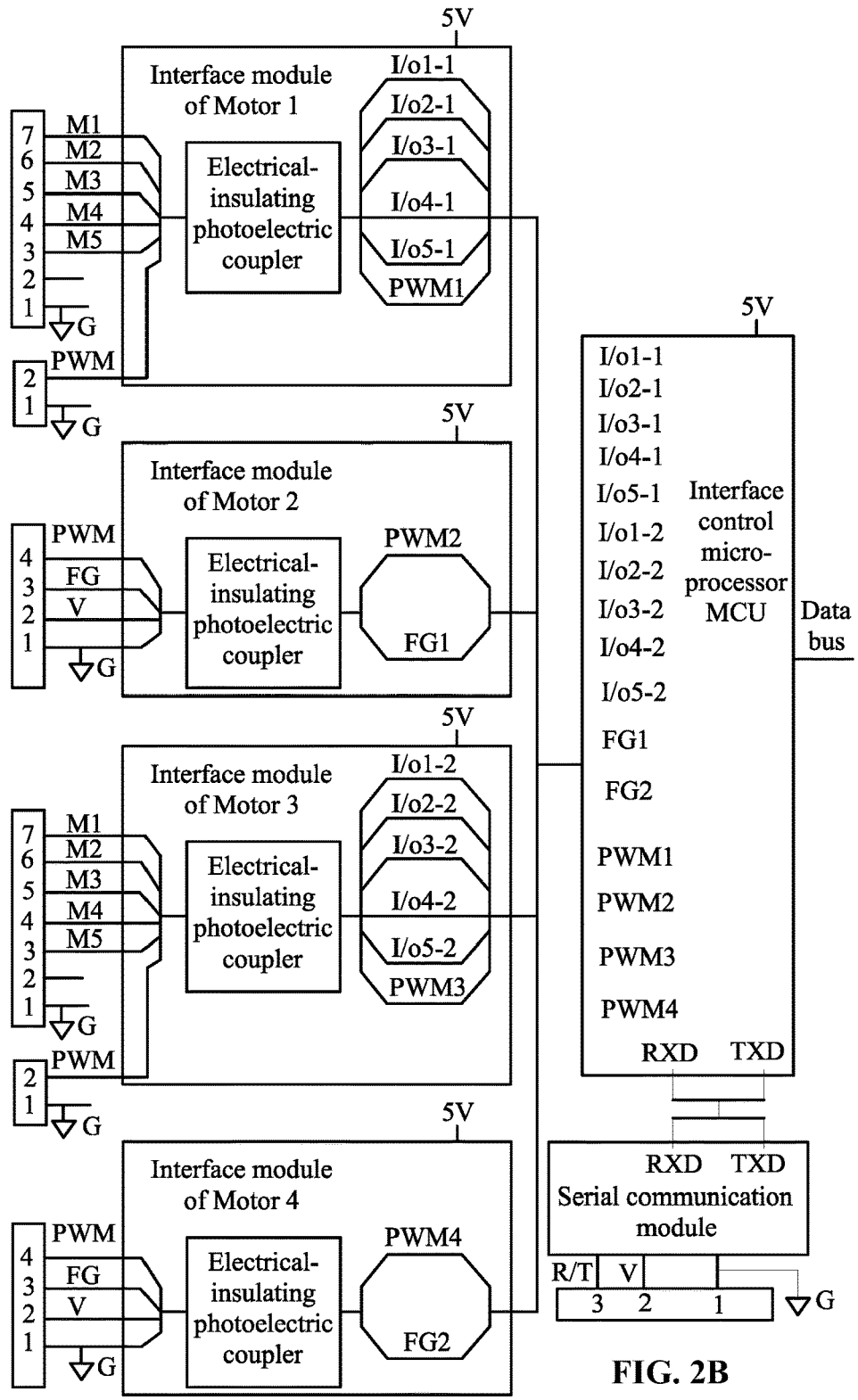
Figure 3:
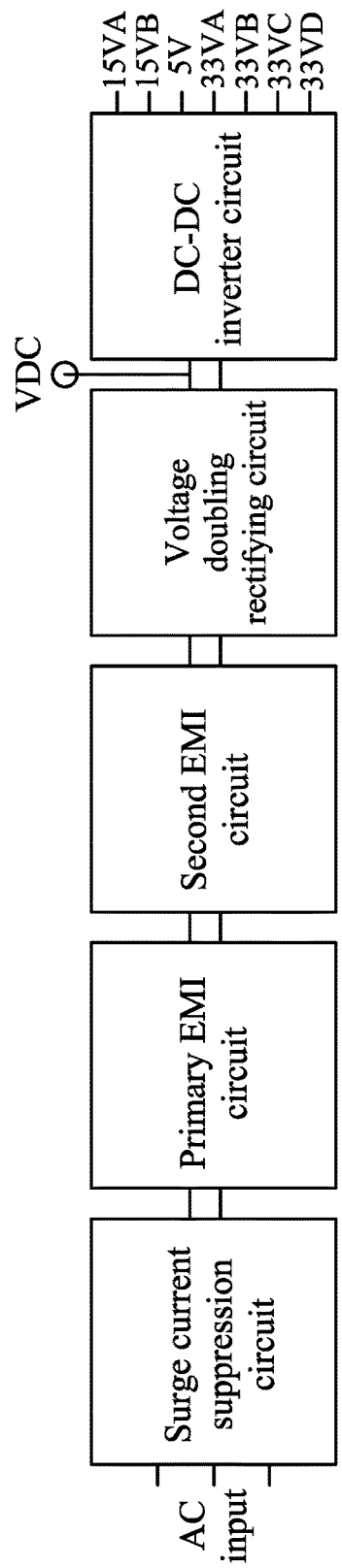
FIG. 3 is a circuit block diagram of a power source module in Example 1 of the present disclosure.

As shown in FIG. 1, FIG. 2A and FIG. 2B, a centralized control mechanism for multi-motor drive comprises a plurality of independent motor drive modules, a power source module, an interface control microprocessor, a communication module, and a plurality of interface modules of motors; the power source module supplies power for each circuit, each independent motor drive module drives one permanent magnet (PM) motor, motor drive module comprises a motor microprocessor, an inverter circuit, and a phase current detection circuit; the phase current detection circuit transmits detected data to the motor microprocessor, the motor microprocessor outputs multiple paths of PWM signals to the inverter circuit and controls the inverter circuit to work; an output end of the inverter circuit is connected to a coil winding of the PM motor; the plurality of motor microprocessors communicates with the interface control microprocessor via a data bus DATABUS; the interface control microprocessor communicates with outside via the communication module; the interface control microprocessor is connected to one end of each interface module of motors, and the other end of each interface module of motors communicates with a control circuit board of an electrical apparatus, the control circuit board of the electrical apparatus controls one independent motor drive module to drive one PM motor via one motor interface module.

The plurality of independent motor drive modules, the power source module, the interface control microprocessor, the communication module, and the plurality of interface modules of motors are integrated on one circuit board. The control circuit board of the electrical apparatus is a main control circuit board of an air conditioner.

The plurality of independent motor drive modules is at least three in number. The PM motor is a three-phase permanent magnet synchronous motor comprising three-phase coil windings U, V, W; the power source module outputs at least two-way power supply to the inverter circuit, and outputs at least four independent power supplies to the motor microprocessor and the interface control microprocessor.

The inverter circuit is an integrated intelligent power module IPM. The communication module is of a series compunction module, an external electrical apparatus communicates with the interface control microprocessor and each motor microprocessor via the series compunction module; and the interface module of motors is of an electrically insulated photocoupler.

As shown in FIGS. 2A and 2B, the plurality of independent motor drive modules is four in number, that is, the motor drive module A, the motor drive module B, the motor drive module C, and the motor drive module D. The motor drive module A, the motor drive module B, the motor drive module C, and the motor drive module D respectively drive four motors, that is, Motor 1, Motor 2, Motor 3, and Motor 4; the plurality of interface modules of motors comprises the interface module of Motor 1, the interface module of Motor 2, the interface module of Motor 3, and the interface module of Motor 4; the interface module of Motor 1, the interface module of Motor 2, the interface module of Motor 3, and the interface module of Motor 4 are in communication connection to the interface control microprocessor MCU; the interface control microprocessor MCU communicates with the four motor microprocessors via the data bus DATABUS.

As shown in FIGS. 3, 4A, 4B and 4C, the power supply module comprises a surge current suppression circuit, a primary EMI circuit, a secondary EMI circuit, a voltage doubling rectifying circuit, and a DC-DC converter circuit; an input end of the surge current suppression circuit is connected to an AC input; the surge current suppression circuit, the primary EMI circuit, the secondary EMI circuit, the voltage doubling rectifying circuit, and the DC-DC converter circuit are connected sequentially in that order; an output end of the voltage doubling rectifying circuit outputs a DC bus voltage VDC; and an output end of the DC-DC converter circuit outputs multiple ways of independent power supplies for the inverter circuit, the interface control microprocessor, and the motor microprocessor. The surge current suppression circuit comprises a first varistor V1, a second varistor V2, a third varistor V3, and a gas discharge tube TB. The primary EMI circuit comprises a first capacitor C1, a second capacitor C2, a third capacitor C3, a first resistor R1, a second resistor R2, a third resistor R3, and a first inductor L1. The second EMI circuit comprises a 4th capacitor C4, a 5th capacitor C5, a 6th capacitor C6, a 4th resistor R4, a 5th resistor R5, a 6th resistor R6, and a second inductor L2. The voltage doubling rectifying circuit comprises a 7th resistor R7, a 7th capacitor C7, an 8th capacitor C8, a 9th capacitor C9, a 10th capacitor C10, a 11th capacitor C11, a 12th capacitor C12, a 13th capacitor C13, a 14th capacitor C14, a 15th capacitor C15, a 16th capacitor C16, a 17th capacitor C17, a rectifier DB, and a connector JK.

Figure 4A:
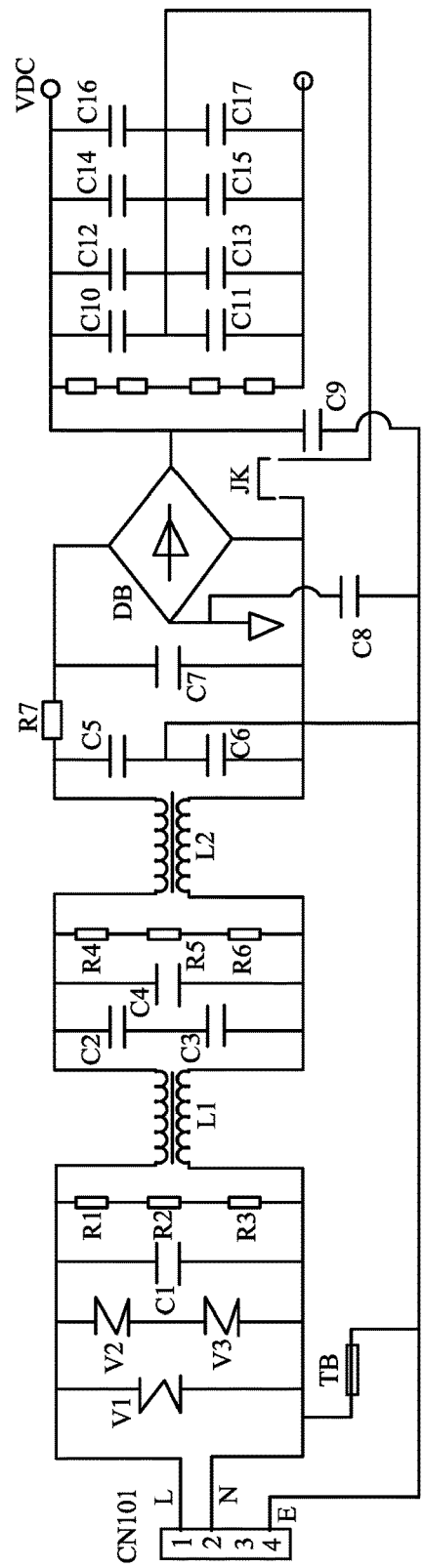
FIG. 4A, FIG. 4B, and FIG. 4C are circuit diagrams corresponding to FIG. 3.
Figure 4B:
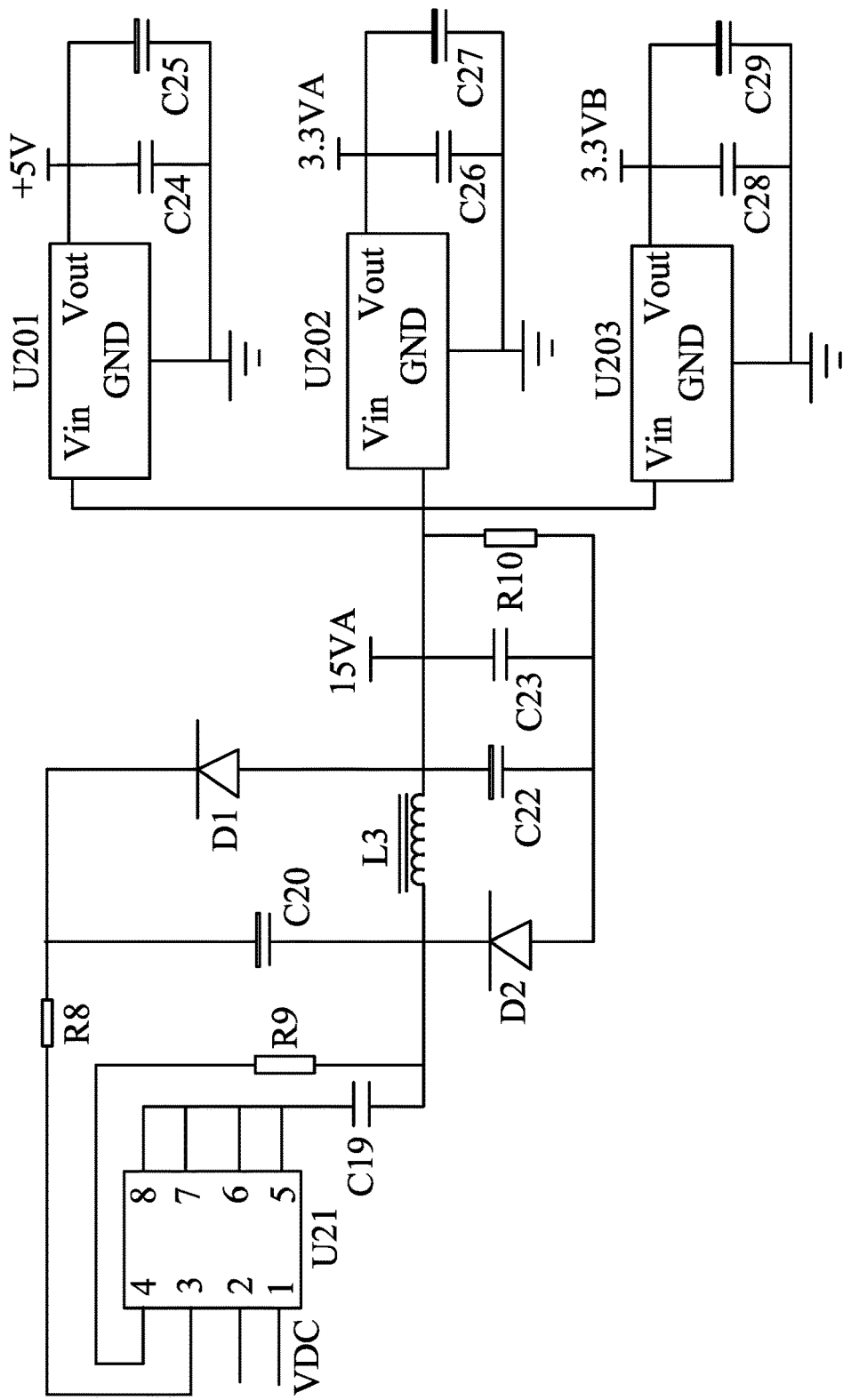
Figure 4C:
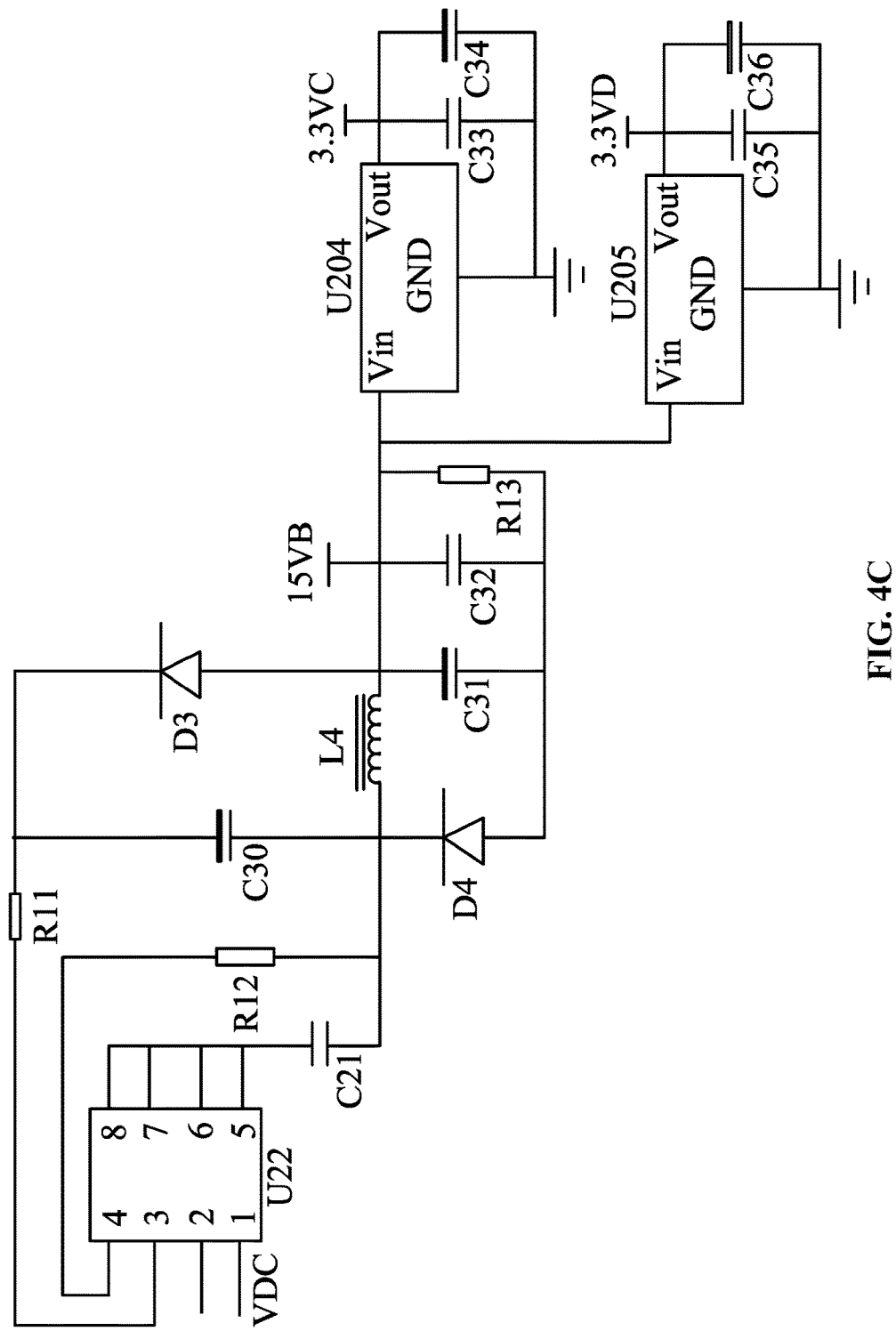

FIG. 4B shows a part of the DC-DC inverter circuit, comprising a primary transformer chip U21, peripheral resistors R8, R9, R10, capacitors C19, C20, C22, C23, diodes D1, D2, a third inductor L3, and the primary transformer chip U21 outputs a power of 15 VA; in addition, the DC-DC inverter circuit further comprises secondary transformer chips U201, U202, U203, and peripheral devices, the secondary transformer chips U201, U202, U203 output powers of 5V, 3.3 VA, and 3.3 VB, respectively. FIG. 4C shows another part of the DC-DC inverter circuit, comprising a primary transformer chip U22, peripheral resistors R11, R12, R13, capacitors C21, C30, C31, C32, diodes D3, D4, a fourth inductor L4, and the primary transformer chip U22 outputs a power of 15 VB; in addition, the DC-DC inverter circuit further comprises secondary transformer chips U204, U205, and peripheral devices, the secondary transformer chips U204, U205 output powers of 3.3 VC, and 3.3 VD, respectively. Specifically, the powers 3.3VA, 3.3VB, 3.3VC, and 3.3VD are supplied for four motor microprocessors, respectively, ensuring the stable operation of the motor microprocessors. The power 5V is supplied to the interface control microprocessor MCU; the powers 15 VA and 15 VB drive the four integrated intelligent power modules IPM.

Figure 5A:
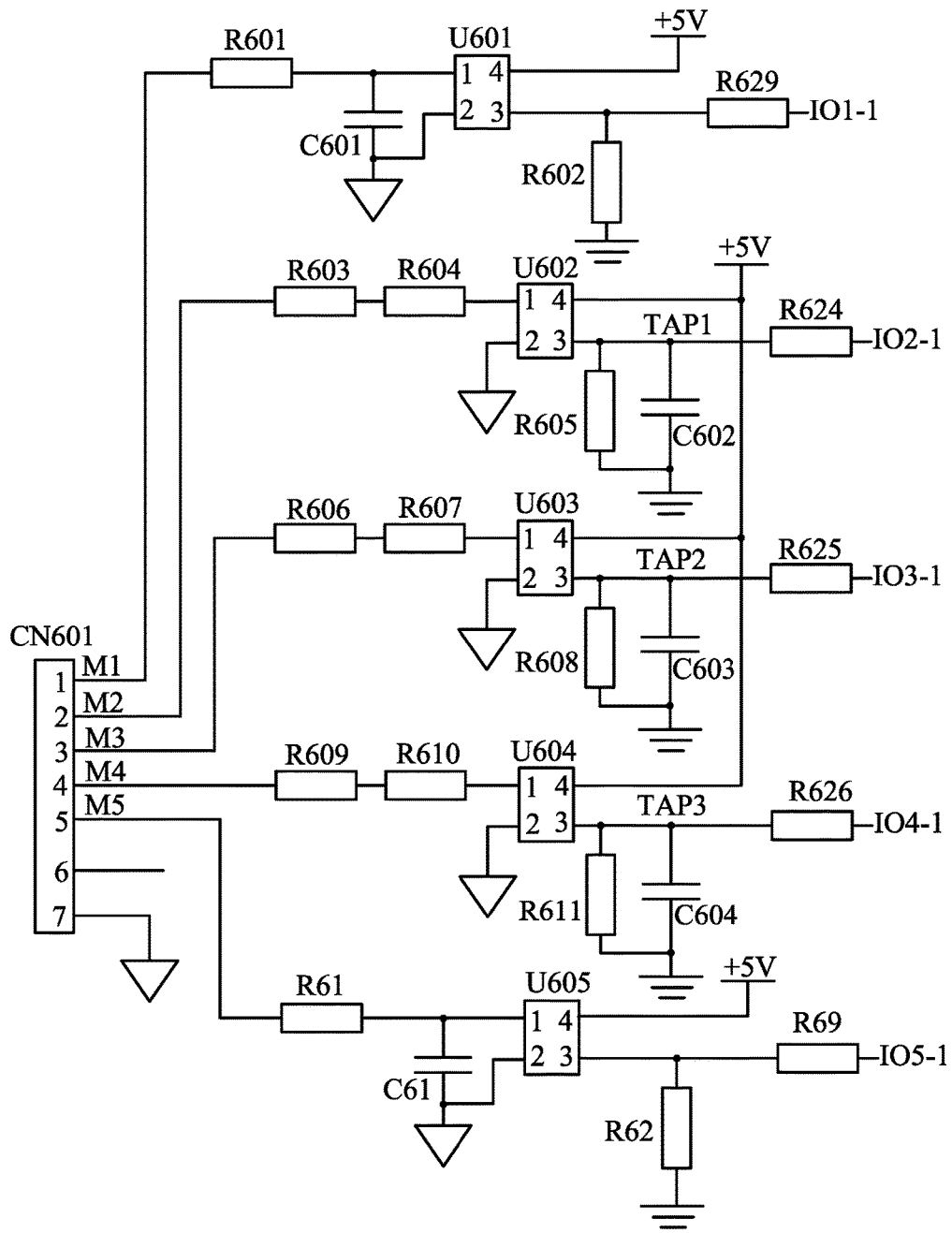
FIG. 5A-5B are circuit diagrams of interface modules of Motor 1 according to one embodiment of the present disclosure.

As shown in FIG. 5A, the interface module of Motor 1 comprises five paths of level signal input M1, M2, M3, M4, and M5, which are converted into digital signals Io1-1, Io2-1, Io3-1, Io4-1, and Io5-1 via five electrically insulated photocouplers, and transmitted to the interface control microprocessor MCU. The interface module of Motor 3 is basically the same as the interface module of Motor 1.

Figure 5B:
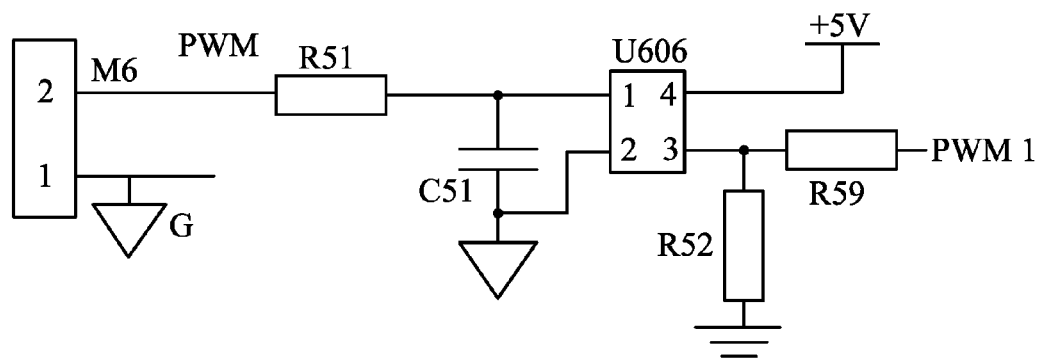

As shown in FIG. 5B, the interface module of Motor 1 comprises one PWM signal input, which is converted into PWM1 via one electrically insulated photocoupler, and transmitted to the interface control microprocessor MCU. The interface module of Motor 3 is basically the same as the interface module of Motor 1.

Figure 6:
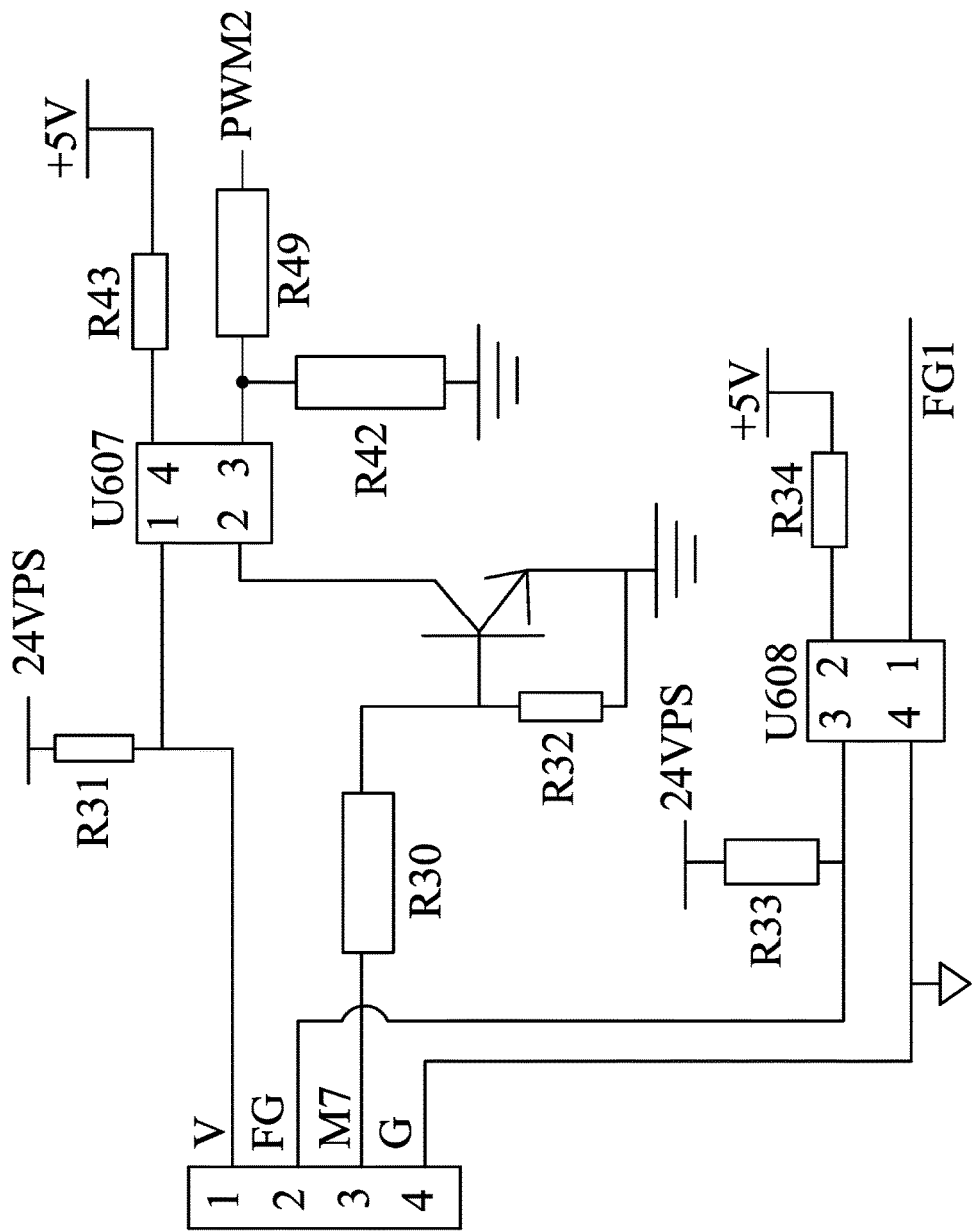
FIG. 6 is a circuit diagram of an interface module of Motor 2 according to one embodiment of the present disclosure.

As shown in FIG. 6, the interface module of Motor 2 comprises four paths of inputs, that is, the power input V (24 VPS), the grounding G, the PWM input, and the FG signal input, which are converted into digital signals PG1 and PWM2 via two electrically insulated photocouplers, and transmitted to the interface control microprocessor MCU. The interface module of Motor 4 is basically the same as the interface module of Motor 2.

Example 2

Figure 7:
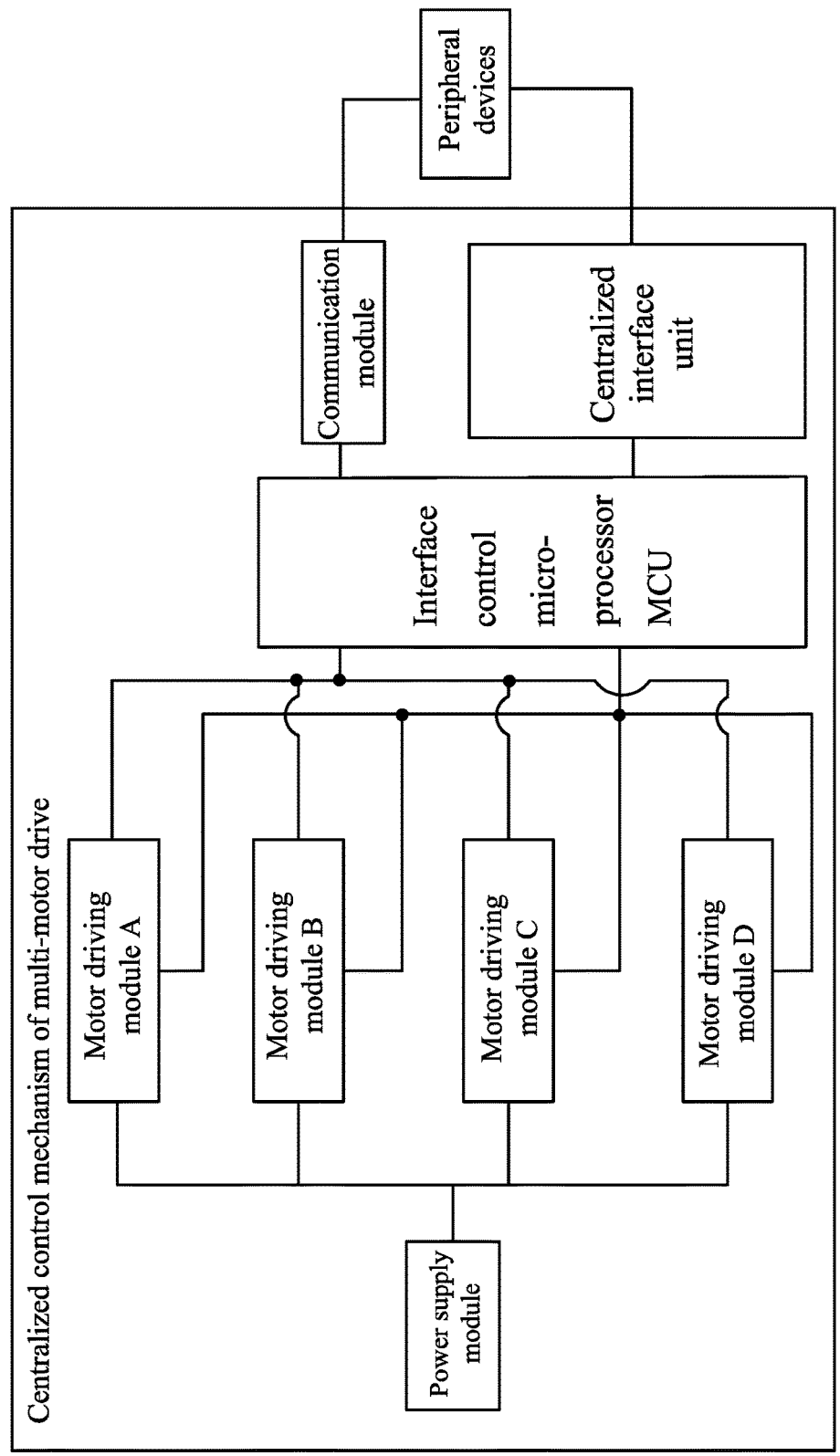
FIG. 7 is a schematic block diagram of a centralized control mechanism for multi-motor drive in Example 2 of the present disclosure.
Figure 8A:
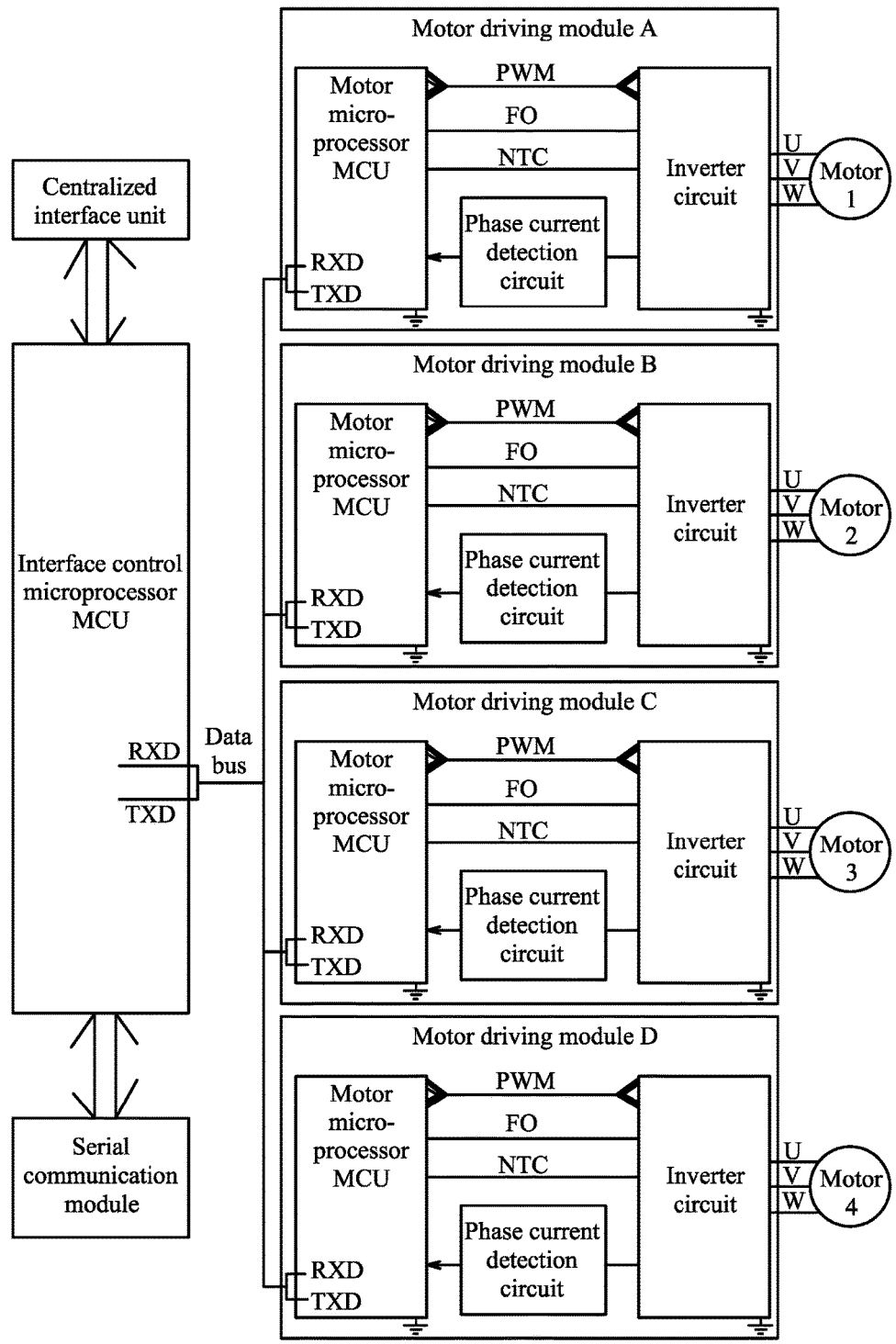
FIG. 8A and FIG. 8B are circuit diagrams corresponding to FIG. 7.
Figure 8B:
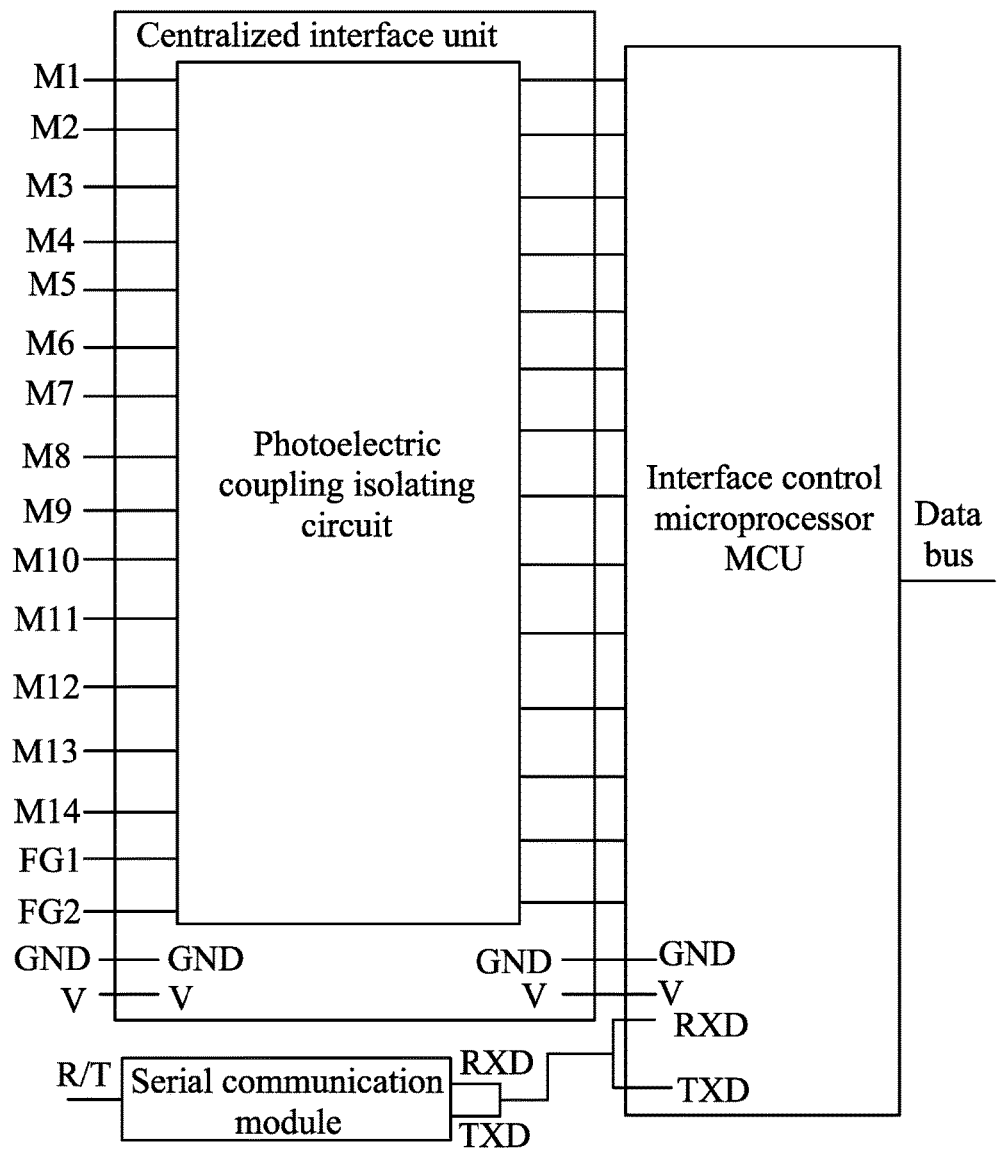

As shown in FIGS. 7, 8A, and 8B, a centralized control mechanism for multi-motor drive comprises an interface control microprocessor and a centralized interface unit. The centralized control mechanism for multi-motor drive comprises a plurality of independent motor drive modules and a power source module; the power source module supplies power to each motor drive module, each independent motor drive module can drive one permanent magnet synchronous motor, and each motor drive module comprises a motor microprocessor, an inverter circuit, and a phase current detection circuit. The phase current detection circuit transmits detected data to the motor microprocessor, the motor microprocessor outputs multiple paths of PWM signals to the inverter circuit and controls the inverter circuit to work; an output end of the inverter circuit is connected to a coil winding of the PM motor; the centralized interface unit comprises a plurality of motor interface modules.

The centralized interface unit comprises a plurality of I/O ports connected to outside, the centralized interface unit is connected to the interface control microprocessor, the plurality of motor microprocessors communicates with the interface control microprocessor via the data bus DATA-BUS. The input control signals of the plurality of motor drive modules enter the centralized interface unit via the plurality of I/O ports, are processed by the centralized interface unit and the interface control microprocessor, and then transmitted to the motor microprocessor; and the feedback output signals of the plurality of motor drive modules are first transmitted to the interface control microprocessor via the motor microprocessor and processed, then transmitted to the centralized interface unit, and output from the I/O ports of the centralized interface unit.

The centralized interface unit comprises a plurality of photoelectric-coupling isolating circuits.

The interface control microprocessor is connected to a serial communication module; a peripheral electrical apparatus can communicate with the interface control microprocessor and each motor microprocessor using the serial communication module.

The centralized interface unit comprises at least ten I/O ports.

The input control signals in the plurality of I/O ports of the centralized interface unit are a PWM signal, a high-voltage or low-voltage level signal, or a digital communication signal.

The input control signals in the plurality of I/O ports of the centralized interface unit comprises a plurality of PWM signals and a plurality of high-voltage or low-voltage level signals.

The input control signals in the plurality of I/O ports of the centralized interface unit comprises a plurality of PWM signals and a plurality of digital communication signals.

In FIG. 8A and FIG. 8B, the centralized control mechanism for multi-motor drive is provided with four independent motor drive modules, comprising a motor drive module A, a motor drive module B, a motor drive module C and a motor drive module D. The motor drive module A, the motor drive module B, the motor drive module C and the motor drive module D respectively drive a motor A, a motor B, a motor C and a motor D. The motor A, the motor B, the motor C and the motor D are permanent magnet synchronous motors (abbreviated for PM motors). The motor drive module A, the motor drive module B, the motor drive module C, and the motor drive module D are of the same structure. Each motor drive module comprises a motor microprocessor, an inverter circuit and a phase current detection circuit. The phase current detection circuit transmits detected data to the motor microprocessor, the motor microprocessor outputs multiple paths of PWM signals to the inverter circuit and controls the inverter circuit to work, and the output end of the inverter circuit is connected to a coil winding of the permanent magnet synchronous motor.

As shown in FIG. 2B, the centralized control mechanism for multi-motor drive comprises four independent motor drive modules, 17 I/O ports of the centralized interface unit, which are the interface modules of Motor 1, Motor 2, Motor 3, and Motor 4, and the structure of the interface module of the Motor 1 is the same as that of the Motor 3, the structure of the interface module of the Motor 2 is the same as that of the Motor 4. The interface module of Motor 1 comprises six I/O ports, that is, ports M1, M2, M3, M4, M5 and M6; the input signal of the ports M1, M2, M3, M4 and M5 is high-voltage or low-voltage level signal or digital communication signal, and the input signal of the port M6 is PWM signal. The interface module of Motor 2 comprises two I/O ports, that is, ports M7 and FG1. The input signal type of the port M7 is high-voltage or low-voltage level signal or digital communication signal. The port FG1 outputs various types of feedback signals, for example, rotation speed feedback signals, power feedback signals, state feedback signals and general PWM signals. The interface module of Motor 1 comprises six I/O ports, comprising ports M8, M9, M10, M11, M12 and M13 respectively, the input signal of the ports M8, M9, M10, M11 and M12 is high-voltage or low-voltage level signal or digital communication signal, and the input signal of the port M13 is PWM signal. The interface module of Motor 4 comprises two I/O ports, that is, ports M14 and FG2. The input signal of the port M14 is high-voltage or low-voltage level signal or digital communication signal, the port FG2 outputs various types of feedback signals, for example, rotation speed feedback signals, power feedback signals, state feedback signals and general PWM signals; in addition, the centralized control mechanism further comprises one serial communication port (R/T), one power source input port (V) and one public port (GND).

As shown in FIG. 5A, the interface module of Motor 1 comprises 6 I/O ports, that is, ports M1, M2, M3, M4, M5 and M6, which are processed by six photoelectric-coupling isolating circuits, respectively, and then input to the interface control microprocessor MCU; the six photoelectric-coupling isolating circuits respectively adopt photoelectric-coupling chips U601, U602, U603, U604, U605 and U606.

As shown in FIG. 6, the interface module of Motor 2 comprises 2 I/O ports, that is, ports M7 and FG1, which are processed by two photoelectric-coupling isolating circuits, respectively, and then input to the interface control microprocessor MCU; the two photoelectric-coupling isolating circuits respectively adopt photoelectric-coupling chips U607 and U608.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A centralized control mechanism for a multi-motor drive, the mechanism comprising:
   a plurality of independent motor drive modules;
   a power source module;
   an interface control microprocessor;
   a communication module; and
   a plurality of interface modules of motors;
   wherein
   the power source module supplies power for each circuit, and each independent motor drive module drives one permanent magnet (PM) motor;
   each motor drive module comprises a motor microprocessor, an inverter circuit, and a phase current detection circuit; the phase current detection circuit transmits detected data to the motor microprocessor, the motor microprocessor outputs multiple paths of PWM signals to the inverter circuit and controls the inverter circuit to work; an output end of the inverter circuit is connected to a coil winding of the PM motor;

the plurality of motor microprocessors communicates with the interface control microprocessor via a data bus;

the interface control microprocessor communicates with outside via the communication module; and the interface control microprocessor is connected to one end of each interface module of motors, and the other end of each interface module of motors communicates with a control circuit board of an electrical apparatus, the control circuit board of the electrical apparatus controls one independent motor drive module to drive one PM motor via one motor interface module.

2. The mechanism of claim 1, wherein the plurality of independent motor drive modules is at least three in number.

3. The mechanism of claim 2, wherein the PM motor is a three-phase permanent magnet synchronous motor comprising three-phase coil windings.

4. The mechanism of claim 1, wherein the power source module outputs at least two-way power supply to the inverter circuit, and outputs at least four independent power supplies to the motor microprocessor and the interface control microprocessor.

5. The mechanism of claim 3, wherein the power source module outputs at least two-way power supply to the inverter circuit, and outputs at least four independent power supplies to the motor microprocessor and the interface control microprocessor.

6. The mechanism of claim 4, wherein the PM motor is a four-phase permanent magnet synchronous motor comprising three-phase coil windings, and the power source module outputs four independent power supplies, which are 3.3VA, 3.3VB, 3.3VC, and 3.3VD, to four motor microprocessors; the power source module outputs one independent power supply, which is 5V DC, to the interface control microprocessor; and the power source module outputs two-way power supply, which is 5VA and 15 VB, to the inverter circuit.

7. The mechanism of claim 5, wherein the PM motor is a four-phase permanent magnet synchronous motor comprising three-phase coil windings, and the power source module outputs four independent power supplies, which are 3.3VA, 3.3VB, 3.3VC, and 3.3VD, to four motor microprocessors; the power source module outputs one independent power supply, which is 5V DC, to the interface control microprocessor; and the power source module outputs two-way power supply, which is 5VA and 15 VB, to the inverter circuit.

8. The mechanism of claim 1, wherein the power supply module comprises a surge current suppression circuit, a primary EMI circuit, a secondary EMI circuit, a voltage doubling rectifying circuit, and a DC-DC converter circuit; an input end of the surge current suppression circuit is connected to an AC input; the surge current suppression circuit, the primary EMI circuit, the secondary EMI circuit, the voltage doubling rectifying circuit, and the DC-DC converter circuit are connected sequentially in that order; an output end of the voltage doubling rectifying circuit outputs a DC bus voltage VDC; and an output end of the DC-DC converter circuit outputs multiple ways of independent power supplies for the inverter circuit, the interface control microprocessor, and the motor microprocessor.

9. The mechanism of claim 3, wherein the power supply module comprises a surge current suppression circuit, a primary EMI circuit, a secondary EMI circuit, a voltage doubling rectifying circuit, and a DC-DC converter circuit; an input end of the surge current suppression circuit is connected to an AC input; the surge current suppression circuit, the primary EMI circuit, the secondary EMI circuit, the voltage doubling rectifying circuit, and the DC-DC converter circuit are connected sequentially in that order; an output end of the voltage doubling rectifying circuit outputs a DC bus voltage VDC; and an output end of the DC-DC converter circuit outputs multiple ways of independent power supplies for the inverter circuit, the interface control microprocessor, and the motor microprocessor.

10. The mechanism of claim 1, wherein the communication module is of a series compunction module, an external electrical apparatus communicates with the interface control microprocessor and each motor microprocessor via the series compunction module; and the interface module of motors is of an electrically insulated photocoupler.

11. The mechanism of claim 3, wherein the communication module is of a series compunction module, an external electrical apparatus communicates with the interface control microprocessor and each motor microprocessor via the series compunction module; and the interface module of motors is of an electrically insulated photocoupler.

12. The mechanism of claim 6, wherein the plurality of independent motor drive modules, the power source module, the interface control microprocessor, the communication module, and the plurality of interface modules of motors are distributed on one circuit board.

13. The mechanism of claim 7, wherein the plurality of independent motor drive modules, the power source module, the interface control microprocessor, the communication module, and the plurality of interface modules of motors are distributed on one circuit board.

14. The mechanism of claim 1, wherein the plurality of interface modules of motors is a centralized interface unit, the centralized interface unit comprises a plurality of I/O ports connected to outside, the centralized interface unit is connected to the interface control microprocessor;

input control signals of the plurality of motor drive modules enter the centralized interface unit via the plurality of I/O ports, are processed by the centralized interface unit and the interface control microprocessor, and then transmitted to the motor microprocessor; and feedback output signals of the plurality of motor drive modules are first transmitted to the interface control microprocessor via the motor microprocessor and processed, then transmitted to the centralized interface unit, and output from the I/O ports of the centralized interface unit.

15. The mechanism of claim 3, wherein the plurality of interface modules of motors is a centralized interface unit, the centralized interface unit comprises a plurality of I/O ports connected to outside, the centralized interface unit is connected to the interface control microprocessor;

input control signals of the plurality of motor drive modules enter the centralized interface unit via the plurality of I/O ports, are processed by the centralized interface unit and the interface control microprocessor, and then transmitted to the motor microprocessor; and feedback output signals of the plurality of motor drive modules are first transmitted to the interface control microprocessor via the motor microprocessor and processed, then transmitted to the centralized interface unit, and output from the I/O ports of the centralized interface unit.

16. The mechanism of claim 14, wherein the input control signals in the plurality of I/O ports of the centralized interface unit are a PWM signal, a level signal, or a digital communication signal.

17. The mechanism of claim 15, wherein the input control signals in the plurality of I/O ports of the centralized interface unit are a PWM signal, a level signal, or a digital communication signal.

18. The mechanism of claim 16, wherein the input control signals in the plurality of I/O ports of the centralized interface unit comprises a plurality of PWM signals and a plurality of level signals.

19. The mechanism of claim 17, wherein the input control signals in the plurality of I/O ports of the centralized interface unit comprises a plurality of PWM signals and a plurality of level signals.

20. The mechanism of claim 16, wherein the input control signals in the plurality of I/O ports of the centralized interface unit comprises a plurality of PWM signals and a plurality of digital communication signals.

21. The mechanism of claim 17, wherein the input control signals in the plurality of I/O ports of the centralized interface unit comprises a plurality of PWM signals and a plurality of digital communication signals.

22. The mechanism of claim 16, comprising four independent motor drive modules; 17 I/O ports of the centralized interface unit comprising 14 signal input ports, parts of the 14 signal input ports inputting PWM signals and the other parts thereof inputting the level signals or digital communication signals; at least two signal output ports which output PWM signals; and one serial communication port, one power source input port, and one public port.

23. The mechanism of claim 17, comprising four independent motor drive modules; 17 I/O ports of the centralized interface unit comprising 14 signal input ports, parts of the 14 signal input ports inputting PWM signals and the other parts thereof inputting the level signals or digital communication signals; at least two signal output ports which output PWM signals; and one serial communication port, one power source input port, and one public port.

* * * * *